(12) United States Patent
Zhang et al.

(10) Patent No.: US 12,276,332 B1
(45) Date of Patent: Apr. 15, 2025

(54) TORQUE TRANSFER MEMBER HAVING A STRENGTHENED FLUID PORT AND METHOD OF MAKING THE SAME

(71) Applicant: GM Global Technology Operations LLC, Detroit, MI (US)

(72) Inventors: Shun Xun Zhang, West Bloomfield, MI (US); Bradly Trine, Marshall, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/493,970

(22) Filed: Oct. 25, 2023

(51) Int. Cl.
| | |
|---|---|
| *F16H 57/04* | (2010.01) |
| *C21D 1/18* | (2006.01) |
| *C21D 6/00* | (2006.01) |
| *C21D 9/32* | (2006.01) |

(52) U.S. Cl.
CPC ............. *F16H 57/043* (2013.01); *C21D 1/18* (2013.01); *C21D 6/00* (2013.01); *C21D 9/32* (2013.01)

(58) Field of Classification Search
CPC ........... F16H 57/043; C21D 1/18; C21D 6/00; C21D 9/32
See application file for complete search history.

(56) References Cited

U.S. PATENT DOCUMENTS

| | | | | |
|---|---|---|---|---|
| 5,305,863 | A | * | 4/1994 | Gooch .................. F16H 61/142 |
| | | | | 192/113.3 |
| 2019/0078609 | A1 | | 3/2019 | Mori et al. |
| 2022/0349448 | A1 | * | 11/2022 | Yamashita ......... B23K 26/0624 |

FOREIGN PATENT DOCUMENTS

| | | |
|---|---|---|
| DE | 10025682 A1 | 11/2001 |
| DE | 102017125094 A1 | 12/2017 |
| DE | 102017113088 A | 12/2018 |
| JP | S611438 A | 1/1986 |
| JP | S62142044 A | 6/1987 |
| JP | H05212629 A | 8/1993 |
| JP | H1066233 A | 3/1998 |

OTHER PUBLICATIONS

Barker, B. "Shot Peening Small Holes," Case Study, Progressive Technologies.
Progressive Surfaces. "Small Hole Shot Peening Applications," https://www.progressivesurface.com/casestudies/small-hole-shot-peening-applications.htm.

* cited by examiner

*Primary Examiner* — Rick K Chang
(74) *Attorney, Agent, or Firm* — Vivacqua Crane, PLLC (57) ABSTRACT

A torque transfer member having a strengthened fluid port and a method of making the same. The torque transfer member includes a body member formed of a steel alloy and is rotatable about a rotational axis. The body member includes an external surface, an interior surface defining a fluid passageway extending through the body, and a fluid port in communication with the fluid passageway. The fluid port includes a port surface connecting the external surface of the body to the interior surface of the fluid passageway. A compressive load above a yield point of the steel alloy is applied to the port surface by using a steel mandrel having a hardness of greater than 60 HRC. The body member is subjected to a heat treated process to form a hardened case after the compressive load is removed from the port surface.

8 Claims, 6 Drawing Sheets

TORQUE TRANSFER MEMBER HAVING A STRENGTHENED FLUID PORT AND METHOD OF MAKING THE SAME

INTRODUCTION

The present disclosure relates to a torque transfer member having a fluid passageway, more specifically to a torque transfer member having a strengthened fluid port for the fluid passageway.

Modern vehicles having conventional internal combustion engines (ICE), electric vehicles having electric engines, and hybrid vehicles having both ICE and electric engine utilize gear boxes, also known as transmissions and differentials in the drivetrain, to transmit torque from the engines to one or more drive wheels for propelling the vehicles. These engines, transmissions, and differentials are composed of a plurality of torque transfer members such as rotatable shafts and gear members. For improved durability and increased fuel efficiency, these torque transfer members have fluid passageways to receive and distribute a lubricating fluid such as motor oils, gear oils, and the like. Such internal fluid passageways may also be configured to distribute a coolant to maintain the operations of such engines, transmissions, and/or differentials within nominal operating temperatures.

Lubricating fluids and/or coolants are introduced into and discharged from the fluid passageways of the torque transfer members by way of fluid ports in communications with the fluid passageways. These fluid ports are typically formed by drilling or boring holes, or openings, through the surfaces of the torque transfer members. The removal of material in forming the openings of the torque transfer member may have a negative impact to the overall endurance and performance of the torque transfer member.

While current torque transfer members having fluid ports, and methods of making the same, serves its purpose, there is a continued need for torque transfer members having improved endurance and performance.

SUMMARY

According to several aspects, a torque transfer member having a strengthen fluid port is disclosed. The torque transfer member includes a body member rotatable about an axis, a fluid passageway extending through the body, and a fluid port in communication with the fluid passageway. The body member includes an external surface, the fluid passageway includes an interior surface, and the fluid port includes a port surface connecting the external surface of the body member to the interior surface of the fluid passageway. The strengthen port is obtained by applying a predetermined compressive load on the port surface and followed by a final heat treat treatment process.

In an additional aspect of the present disclosure, the body member includes a metal alloy having an alloy yield point. The predetermine compressive load is greater than the alloy yield point.

In another aspect of the present disclosure, the strengthened fluid port includes a predetermined acceptable dimensional tolerance. The predetermined compressive load includes an upper compressive load limit above which permanently deforms the strengthened fluid port outside of the predetermined acceptable dimensional tolerance. The predetermined compression load is less than the upper compression load limit. The predetermined compression load is 6 to 8 percent above the alloy yield point.

In another aspect of the present disclosure, metal alloy is a steel alloy.

In another aspect of the present disclosure, the heat treatment process include a carburization heat treatment process or an induction heat treatment process.

In another aspect of the present disclosure, the port surface defines a frustoconical shaped strengthened fluid port. The torque transfer member may be that of a rotatable shaft or a gear member.

According to several aspects, a method of making a torque transfer member having a strengthened fluid port is disclosed. The method includes providing a metal workpiece having a port surface surrounding an opening to a fluid passageway, applying a compressive load onto the port surface using a mandrel, and heat treating the metal workpiece. The metal workpiece includes a yield point. The compressive load is above the yield point.

In an additional aspect of the present disclosure, the port surface defines the fluid port having a predetermined acceptable tolerance. Applying the compressive load onto the port surface includes applying a limited compressive load to avoid deforming the fluid port outside the predetermined tolerance. The compressive load is 5 to 6 percent above the yield point of the metal workpiece. The metal workpiece is a steel alloy.

According to several aspects, a method of making a torque transfer member is provided. The method includes providing a workpiece having a low carbon steel alloy, wherein the workpiece includes a machined fluid port defined by a port surface; applying a predetermined compressive load using a mandrel onto the port surface, wherein the predetermined compressive load is above a yield point of the steel alloy; removing the compressive load from the port surface; and heat treating the workpiece after removing the compressive load from the port surface. The steel alloy includes a hardness less than 25 Harness on Rockwell scale C (HRC) before heat treating the workpiece. The predetermined compressive load is 5 to 6 percent above the yield point of the steel alloy. The torque transfer member may be that of a torque transfer shaft or a gear member.

In an additional aspect of the present disclosure, the low carbon steel alloy is selected from a group consisting of a 5120 steel alloy, 1040 steel alloy, and 8620 steel alloy.

In another aspect of the present disclosure, the mandrel is formed of a tool steel having a hardness of greater than 60 HRC and includes a conical portion or a spherical portion, operable to assert the compressive load onto the port surface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Torque transfer members of vehicle drivetrains often have machined openings for lubrication purposes, such as oil holes, formed on green steel workpieces. The machining of these openings could damage the original surface integrity and grain flow of the area surrounding the machined openings and introduce stress raisers resulting in a shortened service life. The following disclosure provides a torque transfer member having a strengthen fluid port and a method of applying a compressive load to the fluid port surface surrounding the machined openings with a specially designed tool that will compressively deform the port surface material. The compressively deformed green material undergoes a recrystallization process during a final heat treatment process causing a refining of the grain size, which would improve the fluid port surface finish, and provides a remedy for the surface grain flow damage, resulting in improved strength and toughness of the fluid port and torque transfer member.

Figure 1:
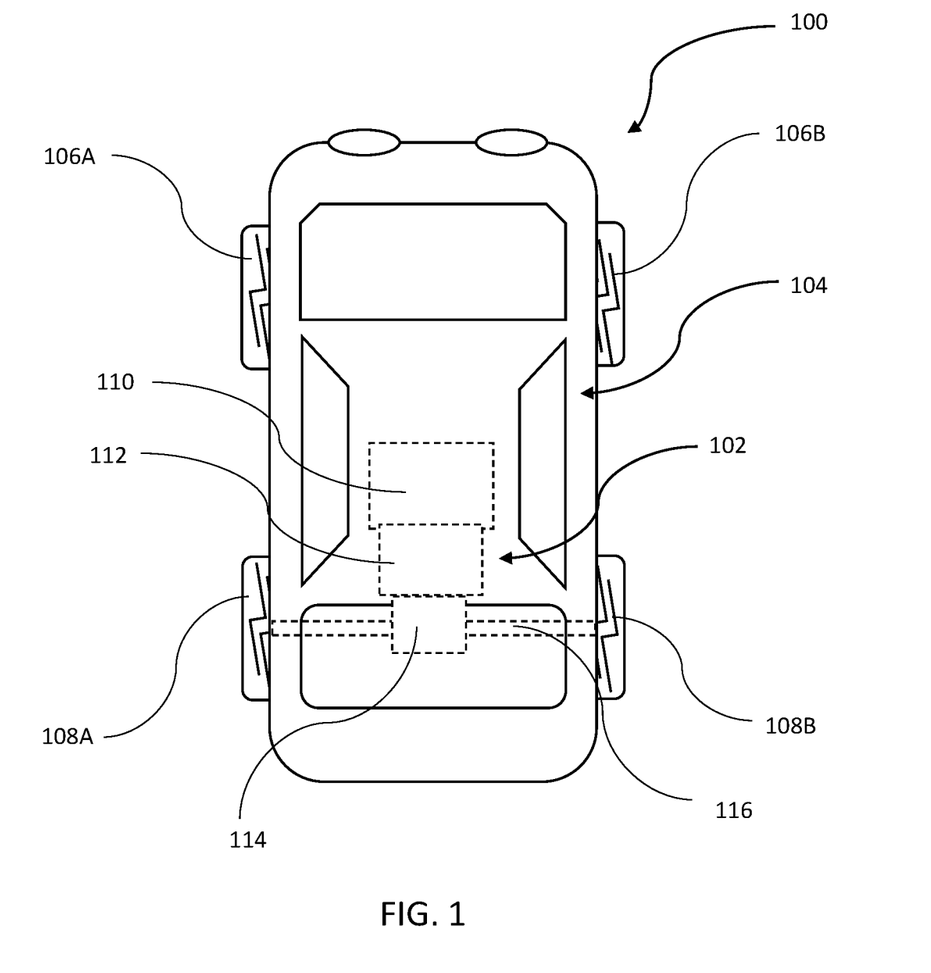
FIG. 1 is a diagram of a plan view of an electric vehicle having an electric drive unit (EDU), according to an exemplary embodiment.

FIG. 1 is a diagrammatic illustration of a non-limiting example of electric vehicle 100 having an Electric Drive Unit (EDU) 102. The vehicle 100 generally includes a body 104 having front wheels 106A, 106B and rear wheels 108A, 108B. The front wheels 106A, 106B and the rear wheels 108A, 108B are each rotationally located near a respective corner of the body 104. The EDU includes three (3) modules: a power electronics 110, an electric motor 112, and a transmission 114. The power electronics are responsible for the conversion of DC voltage from rechargeable batteries (not shown) into a three-phase AC voltage for the overall operation and control of the electric motor 112. The electric motor 112 converts electrical energy into mechanical torque, which is transmitted through the gear box 114 and mechanical linkages 116 to one or more of the wheels 106A, 106B, 108A, 108B for propelling the vehicle 100.

Figure 2:
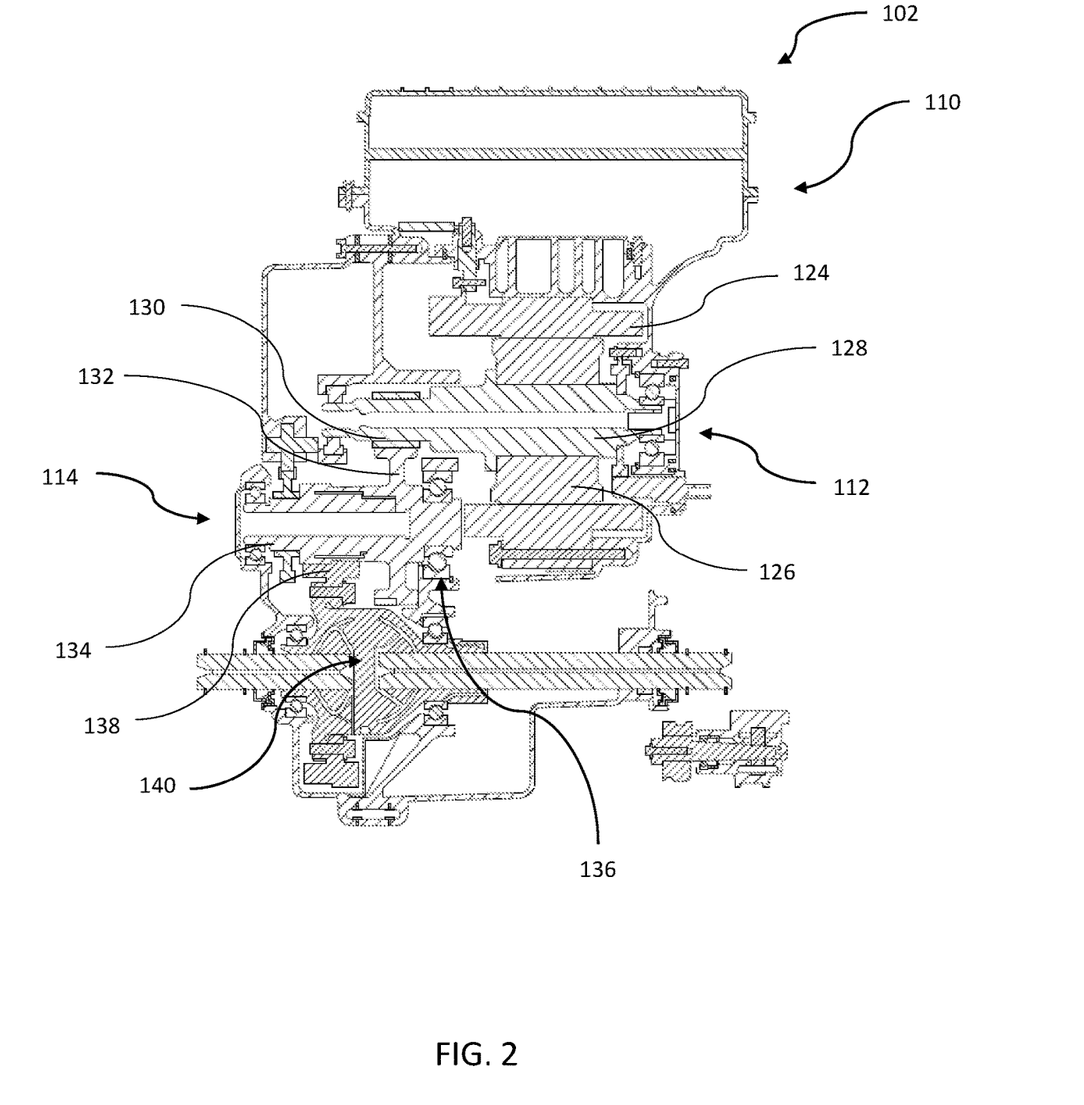
FIG. 2 is an illustration of a cutaway view of the EDU having a plurality of torque transfer members, according to an exemplary embodiment.

FIG. 2 is an illustration of a cross-sectional view of the EDU 102. The electric motor 112 includes a stator 124, a rotor 126 rotatable with respect to the stator 124, a rotor shaft 128 splined to the rotor 126, and a first gear member 130 splined to the rotor shaft 128. The first gear member 130 is meshed to a second gear member 132 splined to a torque transfer shaft 134. The torque transfer shaft 134 is rotatably supported by rolling-element bearings 136. The torque transfer shaft 134 includes a third gear member 138 meshed to a torque distribution gear mechanism 140, also referred to as a differential unit 140.

In operation, the electric motor 112 generates a torque output through the rotor shaft 128. The torque transfer shaft 134 then conveys the torque from the rotor shaft 128 to the differential unit 140, which then selectively distributes the torque to one or more of the vehicle wheels 106A-B, 108A-B to propel the vehicle 100. The torque transfer shaft 134 is subjected to a heat treatment process to form a hardened case for wear resistance while retaining the toughness and ductility of a low carbon steel core. The heat treatment process may include carburization, in which carbon atoms are diffused into the surface of a low carbon steel shaft to form a carbon rich case and quench hardened. In an alternative embodiment, the heat treatment process may include induction heating a high carbon steel core and quench hardened.

While the vehicle 100 is depicted as a passenger car, other examples of vehicles include, but are not limited to, land vehicles such as motorcycles, trucks, sport utility vehicles (SUVs), and recreational vehicles (RVs), and non-land vehicles including marine vessels and aircrafts. It should be appreciated that while an electric vehicle is described, the disclosure of the torque transfer members, such as the torque transfer shafts and gear members, are also applicable to those on conventional internal combustion vehicles and hybrid-vehicles.

Figure 3A:
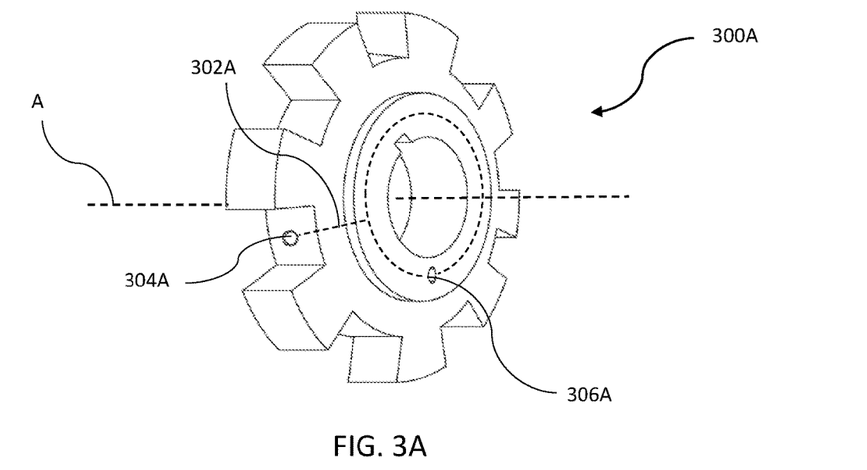
FIGS. 3A and 3B are illustrations of exemplary torque transfer members.
Figure 3B:
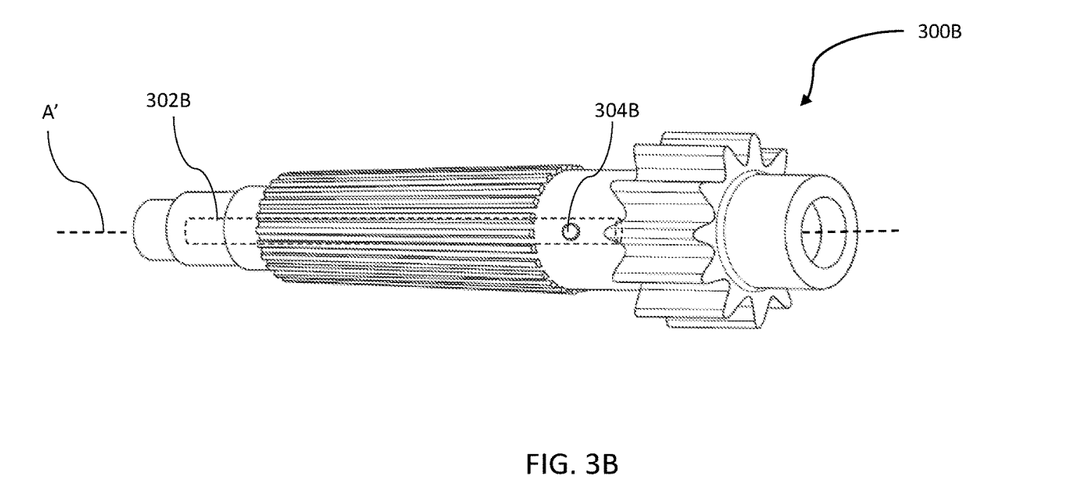

FIGS. 3A and 3B show non-limiting examples of rotatable torque transfer members, such as a gear member 300A and an output shaft 300B disposed about an axis of rotation A, A', respectively. Each of the torque transfer members 300A, 300B includes a network of internal passageways 302A, 302B configured to convey a fluid and at least one fluid port 304A, 304B, 306A. A fluid port is defined as the area surrounding an inlet opening or outlet opening of a fluid passageway. The fluid ports 304A, 304B are shown to be perpendicular to the axis of rotation A, A', respectively. The fluid port 306A is shown parallel to the axis of rotation A in FIG. 3A. The individual fluid ports 304A, 304B, 306A may be inlet ports or outlet ports. The fluid may be that of a lubricating fluid such as gear oil or that of a coolant such as ethylene glycol.

Figure 4A:
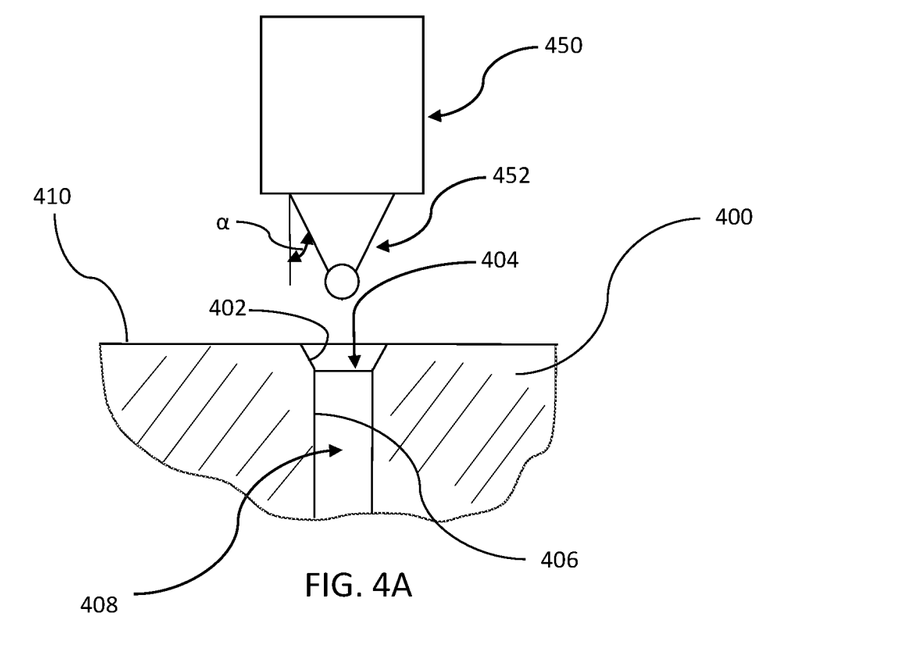
FIGS. 4A and 4B are illustrations of using a mandrel to apply a compressive load on a surface of a fluid port, according to an exemplary embodiment.

FIG. 4A shows an illustration of a cross-section of a portion of a torque transfer member 400 having a fluid port 402 surrounding an opening 404 to a fluid passageway 408 and a mandrel 450 having a conical portion 452 spaced from the fluid port 402. The torque transfer member 400 may be that of the gear member 300A or torque transfer shaft 300B. The torque transfer member 400 includes an interior surface 406 defining the fluid passageway 408 and an exterior surface 410 defining the opening 404.

Figure 4B:
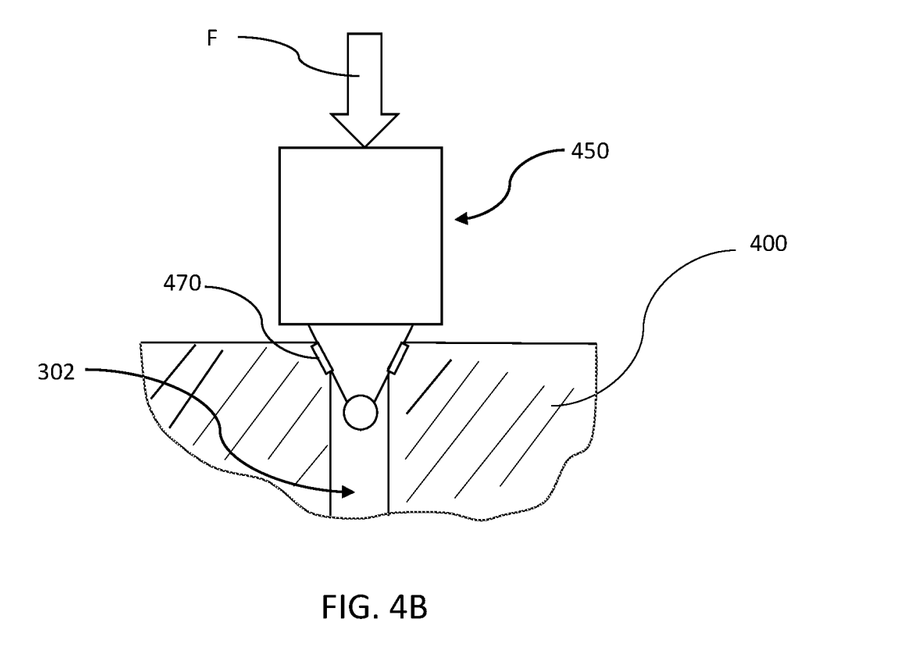
Figure 5:
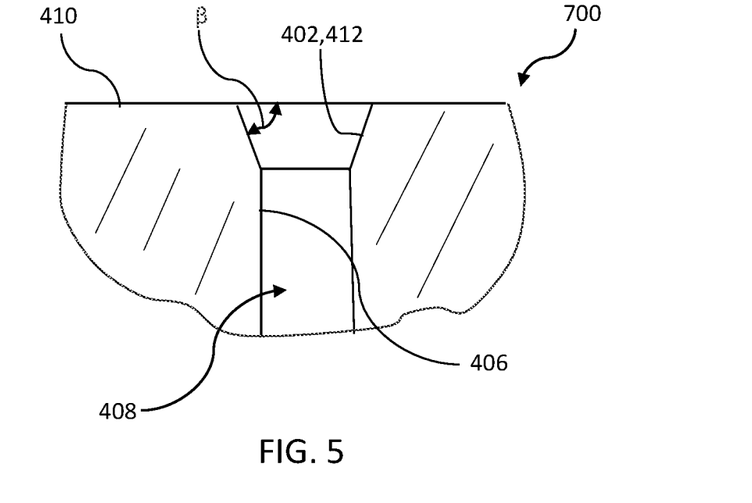
FIG. 5 is a detailed view of the fluid port, according to an exemplary embodiment.

Best shown in FIG. 5, the fluid port 402 includes a chamfered port surface 412 intersecting the exterior surface 410 and the interior surface 406 of the fluid passageway 408 to define a frustoconical shaped fluid port 402. Referring to FIGS. 4A, 4B, and 5, the fluid port 402 is in communication with the fluid passageway 408. The conical portion 452 of the mandrel 450 includes a form factor that is capable of abutting against the port surface 412 of the fluid port 402 as shown in FIG. 4B.

The mandrel 450 is made of a tool steel with a hardness greater than 60 Harness on Rockwell scale C (HRC) and a contact portion 452 operable to abut against the port surface 412 of the fluid port 402. The non-limiting contact portion 452 shown includes a cone shape with a 30 to 60 spatial angle α. The mandrel 450 may be mounted on a press machine (not shown) operable to press the mandrel 450 onto the port surface 412 the fluid port 402. The torque transfer member 400 is supported without any movement during the pressing process. The port surface 412 of the fluid port 402 is pressed to yield the material and alter the grain flow characteristics in that region 470 prior to heat treatment, which results in improved durability (i.e. increased fatigue life).

Figure 7:
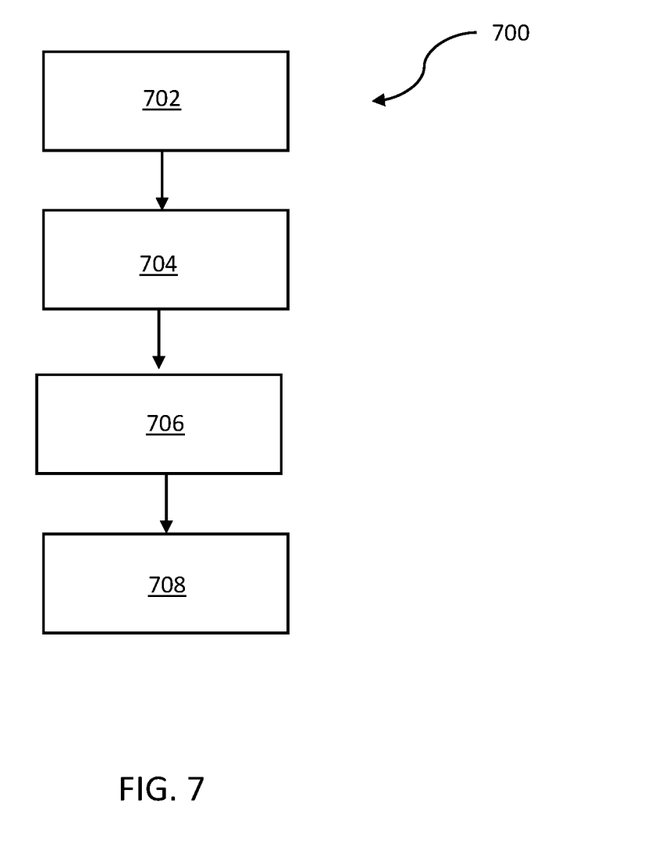
FIG. 7 is a block flow diagram of a method of making a torque transfer member having a strengthened fluid port.

FIG. 7 is a block flow diagram of a method of making a rotatable torque transfer member having a strengthen fluid port with improved durability (Method 700). Referring to FIG. 7 and FIG. 4A, FIG. 4B, and FIG. 5, the Method 700 begins at Block 702 by providing a green state torque transfer member 400. The torque transfer member 400 may be formed of a metal alloy including, but not limited to, 5120, 1040, 8620 steel alloys. Green state means that the torque transfer member 400 has not undergone through a final hardening heat treatment process and includes a hardness less than 25 HRC. In the non-limiting embodiment shown, the torque transfer member 400 includes a fluid passageway 408 and a fluid port 402 surrounding an opening 404 in communication with the fluid passageway 408. The fluid port 402 includes a port surface 412 defining a frustoconical shaped fluid port 402 surrounding the opening 404. The port surface 412 includes an angle β between 30 to 60 degrees with respect to the exterior surface 410 of the torque transfer member 400 at the intersection between the exterior surface 410 and the port surface 412.

Proceeding to Block 704, a mandrel 450 having a conical portion 452 capable of abutting the port surface 412 of the fluid port 402. The mandrel 450 is axially aligned with the opening 404 is moved axially toward the opening 404 until the conical portion 452 is pressed against the port surface 412. In other words, the conical portion 452 of the mandrel 450 is pressed against the port surface 412 of frustoconical shaped fluid port 402.

Proceeding to Block 706, a predetermined compressive load is applied to the port surface 412 by the conical portion 452 of the mandrel 450. A sufficient amount of force F is applied by the mandrel 450 against the port surface 412 until the compressive load acting on the port surface 412 exceeds the yield point of the metal alloy, but less than the amount of force required to deform the port surface 412 of the fluid port 402 outside of acceptable tolerances. The yield point is defined as the point on a stress-strain curve that indicates the limit of elastic behavior and the beginning of plastic behavior. Below the yield point, the metal alloy will deform elastically and will return to its original shape when the applied stress is removed. Once the yield point is passed, some fraction of the deformation will be permanent and non-reversible and is known as plastic deformation.

Figure 6:
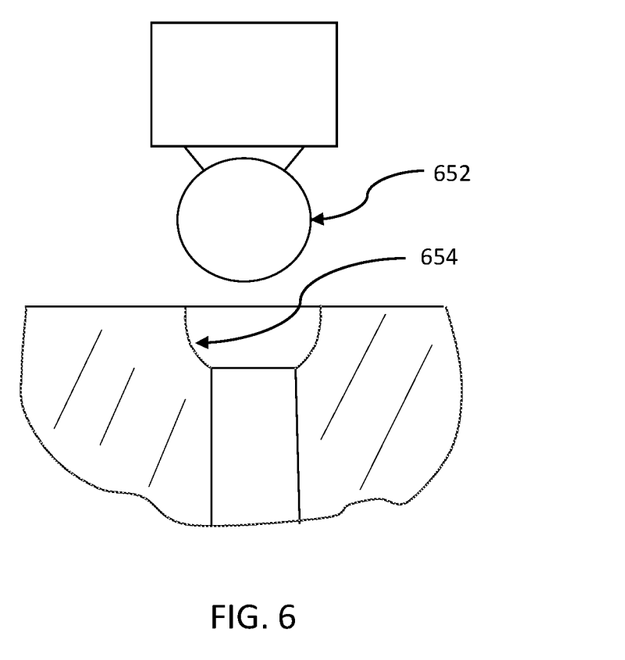
FIG. 6 is an alternative embodiment of a mandrel.

Applying a force to generate a compressive load of 5 to 6 percent above the yield point of the metal alloy is preferred. While the mandrel is shown having a conical shaped portion, the mandrel may have that of a spherical shaped portion as shown in FIG. 6 in lieu of the conical shaped portion 652. The spherical shaped portion effectuates a concaved curvature 654 in the surface of the plastically deformed fluid port 402, thus further enhancing the strength of the fluid port 402 by distributing the stress about the fluid port 402.

Proceeding to Block 708, the mandrel 450 is removed and the torque transfer member 400 is subjected to a final heat treatment process, such as carburization and quench hardening, or induction heat and quench hardening. The plastically deformed green state metal alloy of the fluid port 402 undergoes a recrystallization process during the heat treatment process. The recrystallization causes a refining of the grain size, which improves the toughness of the surface 412 of the fluid port 402 including the immediate regions 470 or areas 470 of the torque transfer member 400 surrounding the fluid port 400.

Tables 1 and 2 below are the durability test results of a test drivetrain main shaft. Table 1 shows the durability test results of a test drivetrain main shaft that have not undergone the Method 700. Table 2 shows durability test results of a test drivetrain main shaft that have undergone the Method 700.

TABLE 1

Durability test results of Main shaft without application of method

Test Load (Nm)

| Sample ID | Max Load | Min Load | Mean load | Amplitude | R = −1 Amplitude | R = 0 Range | Cycles |
|---|---|---|---|---|---|---|---|
| SN10 | 3952 | 50 | 2001 | 1951 | 2776.75 | 3926.92 | 145,504 |
| SN11 | 3952 | 50 | 2001 | 1951 | 2776.75 | 3926.92 | 615,255 |
| SN12 | 3952 | 50 | 2001 | 1951 | 2776.75 | 3926.92 | 434,536 |
| SN15 | 3952 | 50 | 2001 | 1951 | 2776.75 | 3926.92 | 523,134 |
| SN16 | 3952 | 50 | 2001 | 1951 | 2776.75 | 3926.92 | 141,150 |
| SN17 | 3952 | 50 | 2001 | 1951 | 2776.75 | 3926.92 | 429,082 |
| SN20 | 3952 | 50 | 2001 | 1951 | 2776.75 | 3926.92 | 849,626 |
| SN21 | 3952 | 50 | 2001 | 1951 | 2776.75 | 3926.92 | 189,943 |
| SN22 | 3952 | 50 | 2001 | 1951 | 2776.75 | 3926.92 | 407,164 |

TABLE 2

Durability test results of Main shaft with application of method

Test Load (Nm)

| Sample ID | Max Load | Min Load | Mean load | Amplitude | R = −1 Amplitude | R = 0 Range | Cycles |
|---|---|---|---|---|---|---|---|
| SN1 | 3952 | 50 | 2001 | 1951 | 2776.75 | 3926.92 | 1,577,577 |
| SN2 | 3952 | 50 | 2001 | 1951 | 2776.75 | 3926.92 | stopped at 1 million |
| SN3 | 3952 | 50 | 2001 | 1951 | 2776.75 | 3926.92 | 1,785,272 |

TABLE 2-continued

Durability test results of Main shaft with application of method

| | Test Load (Nm) | | | | | | |
|---|---|---|---|---|---|---|---|
| Sample ID | Max Load | Min Load | Mean load | Amplitude | R = −1 Amplitude | R = 0 Range | Cycles |
| SN4 | 3952 | 50 | 2001 | 1951 | 2776.75 | 3926.92 | 1,249,973 |
| SN5 | 3952 | 50 | 2001 | 1951 | 2776.75 | 3926.92 | 1,602,846 |
| SN6 | 3952 | 50 | 2001 | 1951 | 2776.75 | 3926.92 | stopped at 3 million |

The durability test is a fatigue test with maximum, minimum and mean torsional loads of 3952, 50 and 2001 Newton meters (NM), and accordingly with a cyclic load amplitude, minimum to maximum load ratio R=−1 (fully reversed load) amplitude, and R=0 load range of 1951, 2776.5 and 3926.92, respectively. The test schedule is designed to run until the structural integrity of the test drivetrain main shaft fails by fracturing or breaking.

Referring to Table 1, the test drivetrain main shaft not having undergone the Method 700 experienced failure between 141,150 and 615,255 cycles. Referring to Table 2, the test drivetrain main shaft having undergone the Method 700 experienced failure at greater than 1,249,973 cycles. It should be noted that two (2) of the tests in Table 2 were intentionally stopped due to the high cycle numbers without failure. Table 2 as compared to Table 1 clearly shows that the test drivetrain main shaft having undergone the Method 700 is more robust than the test drivetrain main shaft not having undergone the Method 700.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A torque transfer member having a strengthened fluid port, comprising:
    a body member rotatable about an axis, wherein the body member includes an external surface and a body member toughness;
    a fluid passageway extending through the body member, wherein the fluid passageway includes an interior surface; and
    the strengthened fluid port is in communication with the fluid passageway, wherein the strengthened fluid port includes a port surface connecting the external surface of the body member to the interior surface of the fluid passageway and a region immediately beneath the port surface; and
    wherein the port surface and the region immediately beneath the port surface include a fluid port toughness greater than the body member toughness, wherein the fluid port toughness is obtained by applying a predetermined compressive load onto the port surface and applying a heat treatment process;
    wherein applying the heat treatment process follows applying the predetermined compressive load onto the port surface;
    wherein the body member comprises a metal alloy having an alloy yield point; and
    wherein the predetermined compressive load is greater than the alloy yield point.

2. The torque transfer member of claim 1, wherein:
    the strengthened fluid port includes a predetermined acceptable dimensional tolerance;
    the predetermined compressive load includes an upper compressive load limit above which deforms the strengthened fluid port outside of a predetermined acceptable dimensional tolerance; and
    the predetermined compression load is less than the upper compression load limit.

3. The torque transfer member of claim 1, wherein the predetermined compression load is 6 to 8 percent above the alloy yield point.

4. The torque transfer member of claim 1, wherein the metal alloy is a steel alloy.

5. The torque transfer member of claim 1, wherein the heat treatment process include one of: a carburization heat treatment process, and an induction heat treatment process.

6. The torque transfer member of claim 1, wherein the fluid passageway extends radially perpendicular to the axis of rotation.

7. The torque transfer member of claim 1, wherein the torque transfer member is one of: a shaft and a gear member.

8. The torque transfer member of claim 1, wherein the port surface defines a frustoconical shaped strengthened fluid port.

* * * * *